United States Patent
Park et al.

(10) Patent No.: US 12,536,930 B2
(45) Date of Patent: Jan. 27, 2026

(54) DISPLAY DEVICE AND CONTROL METHOD THEREOF FOR DISPLAY MAIN SCREEN IMAGE AND SUB SCREEN IMAGE

(71) Applicant: SAMSUNG ELECTRONICS CO., LTD., Suwon-si (KR)

(72) Inventors: Jaesung Park, Suwon-si (KR); Seungho Park, Suwon-si (KR); Younghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 18/206,915

(22) Filed: Jun. 7, 2023

(65) Prior Publication Data

US 2023/0368707 A1    Nov. 16, 2023

Related U.S. Application Data

(63) Continuation of application No. PCT/KR2023/003878, filed on Mar. 23, 2023.

(30) Foreign Application Priority Data

May 13, 2022    (KR) .................... 10-2022-0059073

(51) Int. Cl.
*G06F 3/04847*    (2022.01)
*G09G 3/00*    (2006.01)
(Continued)

(52) U.S. Cl.
CPC .......... *G09G 3/002* (2013.01); *G06F 3/04847* (2013.01); *G09G 5/003* (2013.01);
(Continued)

(58) Field of Classification Search
CPC .......... G09G 3/002; G09G 5/003; G09G 5/14; G09G 5/227; G09G 2340/04;
(Continued)

(56) References Cited

U.S. PATENT DOCUMENTS 7,746,356 B2    6/2010 Meinders
9,480,907 B2    11/2016 Benko et al.
(Continued)

FOREIGN PATENT DOCUMENTS

EP    3422707 A1    1/2019
JP    2007-264633 A    10/2007
(Continued)

OTHER PUBLICATIONS

KR20180025286A (ENG Translation), Kim et al. Published on Mar. 8, 2018.*

(Continued)

*Primary Examiner* — Rinna Yi
(74) *Attorney, Agent, or Firm* — Sughrue Mion, PLLC

(57) ABSTRACT

A display device includes: a communication interface; a display; and a processor configured to: based on an image output device being communicably connected to the communication interface, acquire first device information of the image output device, based on a content provided from an external server being selected, control the communication interface to transmit the first device information and second device information of the display device to the external server, the second device information corresponding to the display device, receive the content from the external server through the communication interface, the content including a main screen image corresponding to the second device information, the content being associated with a sub screen image corresponding to the first device information, control the display to display the main screen image, and control the communication interface to transmit the sub screen image to the image output device such that the image output device outputs the sub screen image.

20 Claims, 19 Drawing Sheets

(51) Int. Cl.
    *G09G 5/00*         (2006.01)
    *G09G 5/14*         (2006.01)
    *G09G 5/22*         (2006.01)

(52) U.S. Cl.
    CPC ............... *G09G 5/14* (2013.01); *G09G 5/227* (2013.01); *G06F 2203/04803* (2013.01); *G09G 2340/04* (2013.01)

(58) Field of Classification Search
    CPC ......... G09G 2354/00; G09G 2320/028; G09G 2320/068; G06F 3/04847; G06F 2203/04803; G06F 3/14; G06F 3/1454; G06F 3/048
    See application file for complete search history.

(56) References Cited

U.S. PATENT DOCUMENTS

| | | | |
|---|---|---|---|
| 9,536,493 | B2 | 1/2017 | Cheon et al. |
| 9,836,266 | B2 | 12/2017 | Cheon et al. |
| 10,426,333 | B2 | 10/2019 | Shapiro |
| 11,303,871 | B2 | 4/2022 | Kim et al. |
| 2007/0126864 | A1 | 6/2007 | Bhat et al. |
| 2010/0299436 | A1* | 11/2010 | Khalid .................... G06F 9/452 709/226 |
| 2012/0223885 | A1 | 9/2012 | Perez |
| 2015/0084861 | A1* | 3/2015 | Cheon ................. G06F 3/04883 345/156 |
| 2016/0155410 | A1 | 6/2016 | Nam |
| 2017/0083271 | A1 | 3/2017 | Cheon et al. |
| 2017/0235435 | A1* | 8/2017 | Sohn .................... G06F 3/0481 715/738 |
| 2019/0141412 | A1* | 5/2019 | Lee ..................... H04N 21/437 |
| 2020/0000332 | A1 | 1/2020 | Shapiro |
| 2020/0221061 | A1 | 7/2020 | Kim et al. |
| 2021/0125305 | A1 | 4/2021 | Kawabe |

FOREIGN PATENT DOCUMENTS

| | | |
|---|---|---|
| JP | 2014-509759 A | 4/2014 |
| KR | 10-1429812 B1 | 8/2014 |
| KR | 10-2015-0000783 A | 1/2015 |
| KR | 10-2018-0025286 A | 3/2018 |
| KR | 10-2019-0018914 A | 2/2019 |
| KR | 10-2019-0051428 A | 5/2019 |
| KR | 10-2204599 B1 | 1/2021 |
| KR | 10-2382497 B1 | 4/2022 |
| KR | 10-2023-0055312 A | 4/2023 |
| WO | 2012/118769 A2 | 9/2012 |

OTHER PUBLICATIONS

International Search Report & Written Opinion (PCT/ISA/210 & PCT/ISA/237) issued Jun. 16, 2023 by the International Searching Authority in International Application No. PCT/KR2023/003878.
Lucy Hattersley, "Ambient TV lighting system", retrieved on Jan. 25, 2022 [https://magpi.raspberrypi.com/articles/ambient-tv], 5 pages.
Brett Jones et al., "IllumiRoom by Microsoft Research: Peripheral Projected Illusions for Interactive Experiences", Apr. 30, 2013, [https://www.youtube.com/watch?v=L2w-XqW7bF4], 1 page.
Brett R. Jones et al., "IllumiRoom: peripheral projected illusions for interactive experiences", In Proceedings of the SIGCHI Conference on Human Factors in Computing Systems (CHI '13), Association for Computing Machinery, pp. 869-878, 2013, https://doi.org/10.1145/2470654.2466112.
Andy Wilson, "IllumiRoom: Peripheral Projected Illusions for Interactive Experiences (2013)", established on Jan. 4, 2013, [https://www.microsoft.com/en-us/research/project/illumiroom-peripheral-projected-illusions-for-interactive-experiences/?from=http%3A%2F%2Fresearch.microsoft.com%2Fen-us%2Fprojects%2Fillumiroom%2F, 3 pages.
Communication issued on Oct. 31, 2025 by the Korean Intellectual Property Office in Korean Patent Application No. 10-2022-0059073.

\* cited by examiner

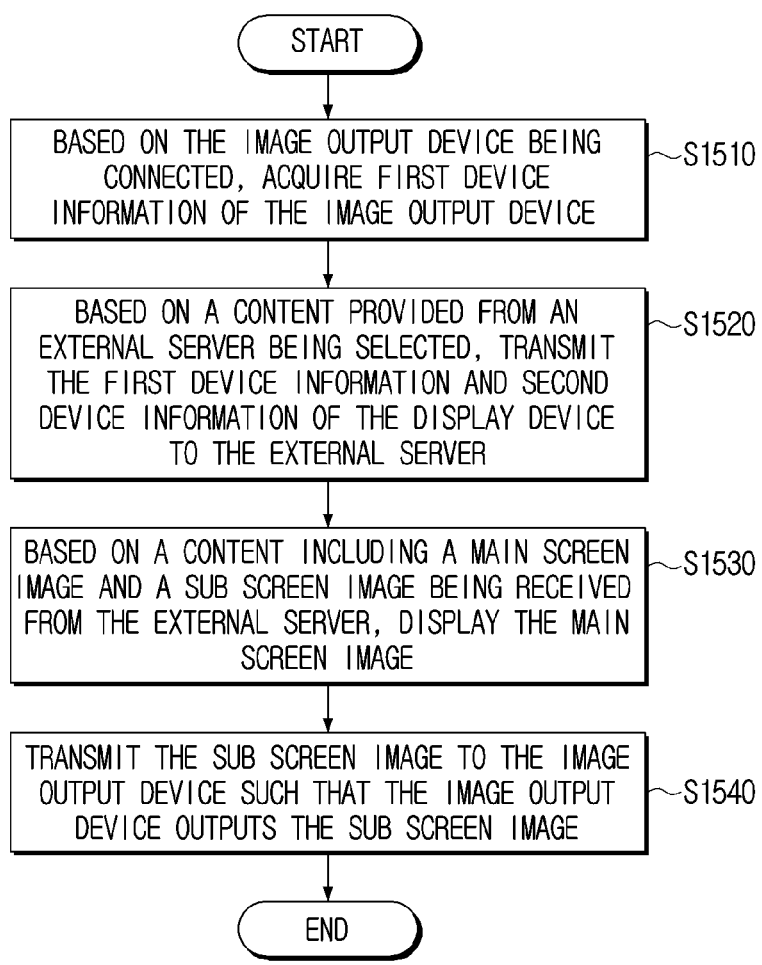

DISPLAY DEVICE AND CONTROL METHOD THEREOF FOR DISPLAY MAIN SCREEN IMAGE AND SUB SCREEN IMAGE

CROSS-REFERENCE TO RELATED APPLICATION(S)

This application is a bypass continuation of International Application No. PCT/KR2023/003878, filed on Mar. 23, 2023, which is based on and claims priority to Korean Patent Application No. 10-2022-0059073, filed on May 13, 2022, in the Korean Intellectual Property Office, the disclosures of which are incorporated by reference herein in their entireties.

BACKGROUND

1. Field

The disclosure relates to a display device and a control method thereof, and more particularly, to a display device that performs communication with an image output device, and a control method thereof.

2. Description of Related Art

There is a recent trend in developing and distributing display devices in various forms.

Furthermore, homes are increasingly using a plurality of display devices of different types (e.g., a TV and a projector device, etc.).

Current technological developments focus enlarging a screen providing a content, and increasing the sense of immersion of a user viewing the content by using display devices of the same type. However, current research regarding a method of enlarging a screen providing a content by using display devices of different types is inadequate.

When providing a content, there is an increasing demand for a method of enlarging a screen providing the content, and providing a user experience increasing the sense of immersion by using a plurality of display devices of different types, other than a single display device or a plurality of display devices of the same type.

SUMMARY

Provided are a display device that exchanges device information among a plurality of devices, and enlarges a screen providing a content by using the plurality of devices, and a control method thereof.

According to an aspect of the disclosure, a display device including: a communication interface; a display; and a processor configured to: based on an image output device being communicably connected to the communication interface, acquire first device information of the image output device, based on a content provided from an external server being selected, control the communication interface to transmit the first device information and second device information of the display device to the external server, the second device information corresponding to the display device, receive the content from the external server through the communication interface, the content including a main screen image corresponding to the second device information, the content being associated with a sub screen image corresponding to the first device information, control the display to display the main screen image, and control the communication interface to transmit the sub screen image to the image output device such that the image output device outputs the sub screen image.

The processor may be further configured to: provide a user interface (UI) screen for selecting a layout arrangement from among a plurality of layout arrangements based on the first device information and the second device information of the display device, and each of the plurality of layout arrangements includes information on an arrangement state of the main screen image and the sub screen image, the arrangement state indicating a position of the main screen image with respect to a position of the sub screen image.

The processor may be further configured to: based on the selected layout arrangement, adjust a resolution of the main screen image based on the arrangement state included in the selected layout arrangement and resolution information of the display included in the second device information, and adjust the resolution of the sub screen image based on the arrangement state and resolution information of the image output device included in the first device information.

The processor may be further configured to control the image output device such that the sub screen image is displayed in an outside area of the display, the outside area identified based on the information on the arrangement state.

The processor may be further configured to, based on the selected layout arrangement, acquire a first guide image for identifying an outer rim area of the display and a second guide image for identifying a location of an image output through the image output device based on the arrangement state included in the selected layout arrangement, control the display to display the first guide image, and control the communication interface to transmit the second guide image to the image output device.

The processor is configured to: based on based on the selected layout arrangement, identify a size of a maximum screen provided through the display and the image output device based on the arrangement state included in the selected layout arrangement, and adjust sizes of the main screen image and the sub screen image based on the identified size of the maximum the screen.

The processor may be further configured to, based on the content received from the external server not including the sub screen image, input the content into a neural network model and acquire the sub screen image corresponding to the content from an output of the neural network model, the neural network model being a model trained to identify an input image as a main screen image, and output the sub screen image corresponding to the main screen image.

The main screen image includes at least one of a screen corresponding to a first viewpoint, or a screen including an object that is controllable in the content according to a user command, and the sub screen image may include at least one of a screen corresponding to a second viewpoint rotated by a specific angle based on the first viewpoint, a background screen, or an additional information screen regarding the content.

The image output device may be a projector device projecting the sub screen image.

The processor may be further configured to acquire the sub screen image having a resolution that is lower than a resolution of the main screen image.

According to an aspect of the disclosure, a control method of a display device, includes: based on an image output device being connected, acquiring first device information of the image output device; based on a content provided from an external server being selected, transmitting the first device information and second device information of the display device to the external server, the second device information corresponding to the display device; receiving the content from the external server, the content including a main screen image corresponding to the second device information, the content associated with a sub screen image corresponding to the first device information, displaying the main screen image; and transmitting the sub screen image to the image output device such that the image output device outputs the sub screen image.

The control method may further include: providing a user interface (UI) screen for selecting a layout arrangement from among a plurality of layout arrangements based on the first device information and the second device information of the display device, and each of the plurality of layout arrangements may include information on an arrangement state of the main screen image and the sub screen image, the arrangement state indicating a position of the main screen image with respect to a position of the sub screen image.

The control method may further include: based the selected layout arrangement, adjusting a resolution of the main screen image based on the arrangement state included in the selected layout arrangement and resolution information of the display included in the second device information; and adjusting the resolution of the sub screen image based on the arrangement state and resolution information of the image output device included in the first device information.

The transmitting the sub screen image to the image output device may include controlling the image output device such that the sub screen image is displayed in an outside area of the display identified based on the information on the arrangement state.

The control method may further include: based on the selected layout arrangement, acquiring a first guide image for identifying an outer rim area of the display and a second guide image for identifying a location of an image output through the image output device based on the arrangement state included in the selected layout arrangement; displaying the first guide image; and transmitting the second guide image to the image output device.

According to an aspect of the disclosure, a display device includes: a communication interface; a display; and a processor configured to: based on an image output device being communicably connected to the communication interface, acquire first device information of the image output device, based on a content provided from an external server being selected, control the communication interface to transmit the first device information and second device information of the display device to the external server, the second device information corresponding to the display device, receive the content from the external server through the communication interface, the content including a main screen image corresponding to the second device information, process the content to determine a sub screen image, control the display to display the main screen image, and control the communication interface to transmit the sub screen image to the image output device such that the image output device outputs the sub screen image.

The processor may be further configured to input the content into a neural network model to determine the sub screen image corresponding to the content from an output of the neural network model, the neural network model being a model trained to identify an input image as a main screen image.

The processor may be further configured to provide a user interface (UI) screen for selecting a layout arrangement from among a plurality of layout arrangements based on the first device information and the second device information of the display device, and each of the plurality of layout arrangements may include information on an arrangement state of the main screen image and the sub screen image, the arrangement state indicating a position of the main screen image with respect to a position of the sub screen image.

The processor may be further configured to: based on the selected layout arrangement, adjust a resolution of the main screen image based on the arrangement state included in the selected layout arrangement and resolution information of the display included in the second device information, and adjust the resolution of the sub screen image based on the arrangement state and resolution information of the image output device included in the first device information.

The processor may be further configured to control the image output device such that the sub screen image is displayed in an outside area of the display, the outside area identified based on the information on the arrangement state.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a flow chart for illustrating a control method of a display device according to one or more embodiments of the disclosure.

DETAILED DESCRIPTION

Figure 1:
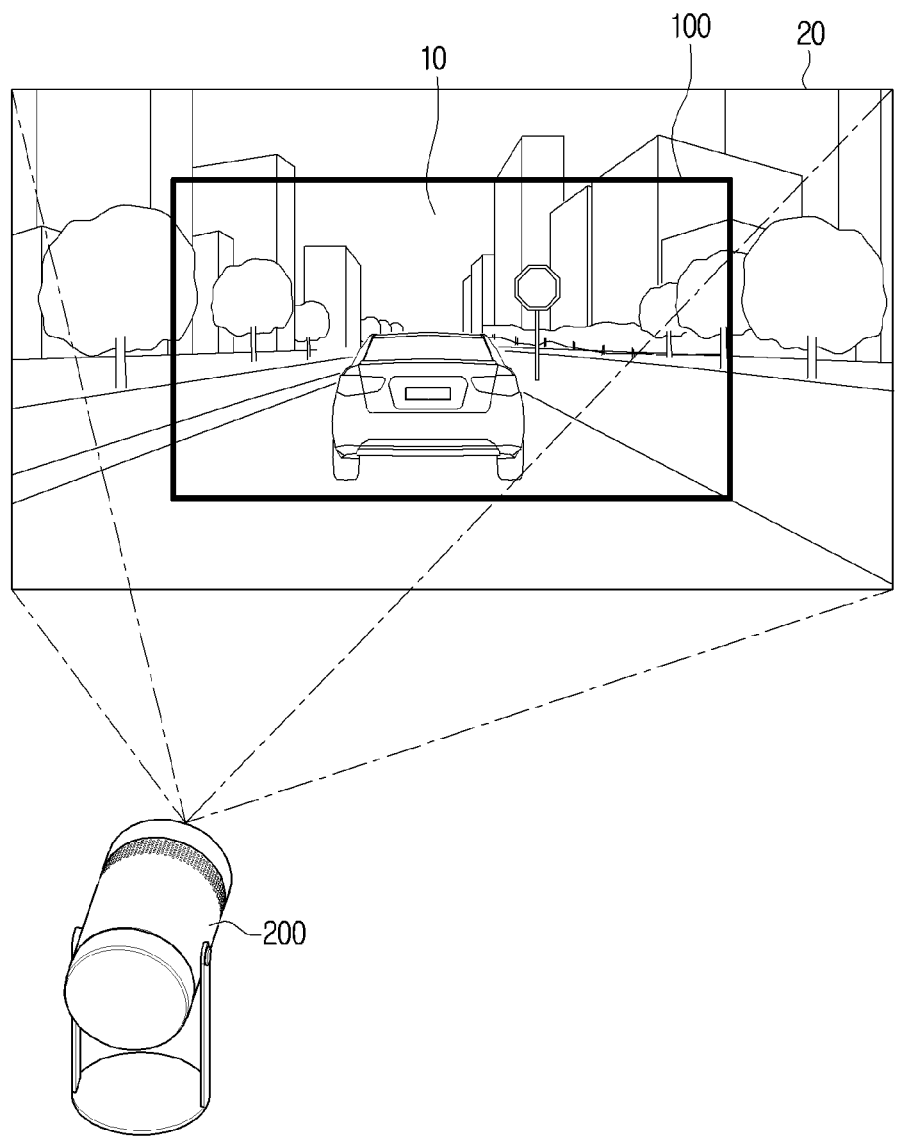
FIG. 1 is a diagram for illustrating operations of a display device and an image output device according to one or more embodiments of the disclosure.

Terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Furthermore, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Furthermore, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. case it is determined that in describing the embodiments, detailed explanation of related known technologies may unnecessarily confuse the gist of the disclosure, the detailed explanation will be omitted.

In addition, terms such as "first," "second," and the like may be used to describe various elements, but the terms are not intended to limit the elements. Such terms are used only to distinguish one element from another element.

Further, singular expressions include plural expressions, unless defined differently in the context. Furthermore, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Furthermore, in the disclosure, "a module" or "a part" performs at least one function or operation, and may be implemented as hardware or software, or as a combination of hardware and software. In addition, a plurality of "modules" or a plurality of "parts" may be integrated into at least one module and implemented as at least one processor, except "a module" or "a part" that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Furthermore, in the drawings, parts that are not related to explanation were omitted, for explaining the disclosure clearly, and throughout the specification, similar components were designated by similar reference numerals.

FIG. 1 is a diagram for illustrating operations of a display device and an image output device according to one or more embodiments of the disclosure.

Referring to FIG. 1, a display device 100 may display a content. The display device 100 may be implemented as a TV, but is not limited thereto, and any device equipped with a display function such as a video wall, a large format display (LFD), digital signage, a digital information display (DID), a projector display, or any other display device known to one of ordinary skill in the art may be applied without limitation. Furthermore, the display device 100 may be implemented as displays in various forms such as a liquid crystal display (LCD), organic light-emitting diodes (OLED), liquid crystal on silicon (LCoS), digital light processing (DLP), a quantum dot (QD) display panel, quantum dot light-emitting diodes (QLED), or any other display technology known to one of ordinary skill in the art.

The display device 100 according to one or more embodiments of the disclosure may include at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a virtual reality (VR) implementation device, or a wearable device. A wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit. Furthermore, in one or more embodiments, the display device 100 may include at least one of a television, a digital video disk (DVD) player, an audio, a refrigerator, an air conditioner, a cleaner, an oven, a microwave oven, a washing machine, an air purifier, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In one or more embodiments, the display device 100 may include at least one of various types of medical instruments, such as, various types of portable medical measurement instruments (e.g., a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of Things (IoT) device (e.g., a light bulb, various types of sensors, a sprinkler device, a fire alarm, a thermostat, a street light, a toaster, exercise equipment, a hot water tank, a heater, a boiler, etc.).

An image output device 200, according to one or more embodiments of the disclosure, may output image data for displaying a content. The image output device 200 may be implemented as a projector device (or, a projector display) projecting an image constituting a content, but is not limited thereto, and any device known to one of ordinary skill in the art equipped with a display function such as a TV, a video wall, a large format display (LFD), digital signage, a digital information display (DID), etc. may be applied without limitation. Furthermore, the image output device 200 may be implemented as displays in various forms such as a liquid crystal display (LCD), organic light-emitting diodes (OLED), liquid crystal on silicon (LCoS), digital light processing (DLP), a quantum dot (QD) display panel, quantum dot light-emitting diodes (QLED), etc.

According to one or more embodiments of the disclosure, the display device 100 and the image output device 200 may be combined, and provide one content. For example, the display device 100 may display some areas (e.g., a portion) of an image included in a content, and the image output device 200 may display the remaining areas (e.g., remaining portions) of the image included in the content.

As illustrated in FIG. 1, an image output through a display included in the display device 100 (hereinafter "main screen image 10") and an image output through the image output device 200 (hereinafter "sub screen image 20") may be combined to form an image included in a content.

Compared to a conventional case of providing an image included in a content by using only the display device 100, if an image included in a content is provided by using both of the display device 100 and the image output device 200, as illustrated in FIG. 1, a user may experience a high sense of immersion. According to the various embodiments of the disclosure, a mode of providing one content by using both of a screen that may be provided through the display device 100 and a screen that may be provided through the image output device 200, and a user experience mode will be generally referred to as a multi-screen experience mode (hereinafter "MSE" mode). A screen may refer to a viewing area for an image. For example, for the display device 100, a screen may correspond to a viewing area of a display panel of the display device 100 that outputs an image, and for the image output device 200, a screen may correspond to a viewing area in which an image is projected or displayed.

Hereinafter, a method of implementing an MSE mode, according to one or more various embodiments of the disclosure, will be described.

Figure 2:
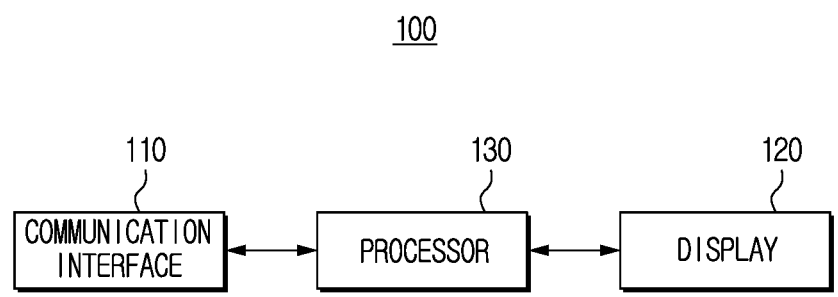
FIG. 2 is a block diagram for illustrating a configuration of a display device according to one or more embodiments of the disclosure.

FIG. 2 is a block diagram for illustrating a configuration of a display device according to one or more embodiments of the disclosure.

According to FIG. 2, the display device 100 may a communication interface 110, a display 120, and a processor 130.

The communication interface 110 according to one or more embodiments of the disclosure, may perform communication with the image output device, an external server, etc., and receive input of various types of data and information. For example, the communication interface 110 may receive input of various types of data, information, etc. from the image output device 200 (e.g., a projector device, etc.), an external storage medium (e.g., a USB memory), an external server (e.g., a cloud server, a webhard), etc. through communication methods/communication standards such as AP-based Wi-Fi (e.g., Wi-Fi, a wireless LAN network), Bluetooth, Zigbee, a wired/wireless local area network (LAN), a wide area network (WAN), an Ethernet, the IEEE 1394, a high-definition multimedia interface (HDMI), a universal serial bus (USB), Thunderbolt™, a mobile high-definition link (MHL), the Audio Engineering Society/European Broadcasting Union (AES/EBU), Optical, Coaxial, etc.

In particular, the communication interface 110, according to one or more embodiments of the disclosure, may transmit a signal for detecting an image output device 200 adjacent to the display device 100, and receive a response signal from the image output device 200.

For example, the communication interface 110 may transmit a signal for detecting an image output device 200 supporting the MSE mode, and receive a response signal from the image output device 200. Subsequently, the communication interface 110 may transmit the response signal to the processor 130, and the processor 130 may generate information on image output devices 200 that are adjacent to the display device 100, and support the MSE mode (e.g., a list for image output devices 200) based on the response signal. Detailed explanation in this regard is described later with reference to FIG. 6 and FIG. 7.

The display 120 according to one or more embodiments of the disclosure may be implemented as displays in various forms such as a liquid crystal display (LCD), organic light-emitting diodes (OLED), liquid crystal on silicon (LCoS), digital light processing (DLP), a quantum dot (QD) display panel, quantum dot light-emitting diodes (QLED), micro light-emitting diodes (μLED), mini LED, etc. The display 120 may also be implemented as a touch screen combined with a touch sensor, a flexible display, a rollable display, a 3D display, a display wherein a plurality of display modules are physically connected, etc.

The processor 130 may be electronically connected with a memory, and controls the overall operations of the display device 100.

According to one or more embodiments of the disclosure, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP) or a communication processor (CP), an ARM processor, an artificial intelligence (AI) processor, or any other processor known to one of ordinary skill in the art. Furthermore, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory.

When the image output device 200 is connected through the communication interface 110, the processor 130, according to one or more embodiments of the disclosure, may acquire first device information of the image output device 200.

Subsequently, when a content provided from an external server is selected, the processor 130 may transmit the first device information and second device information of the display device 100 to the external server.

In response to the device information, the processor 130 may receive a content including a main screen image 10 and a sub screen image 20 from the external server, and control the display 120 to display the main screen image 10.

Furthermore, the processor 130 may transmit the sub screen image 20 to the image output device 200, and the image output device 200 may output the sub screen image 20 received from the display device 100.

Detailed explanation in this regard will be described with reference to FIG. 3.

Figure 3:
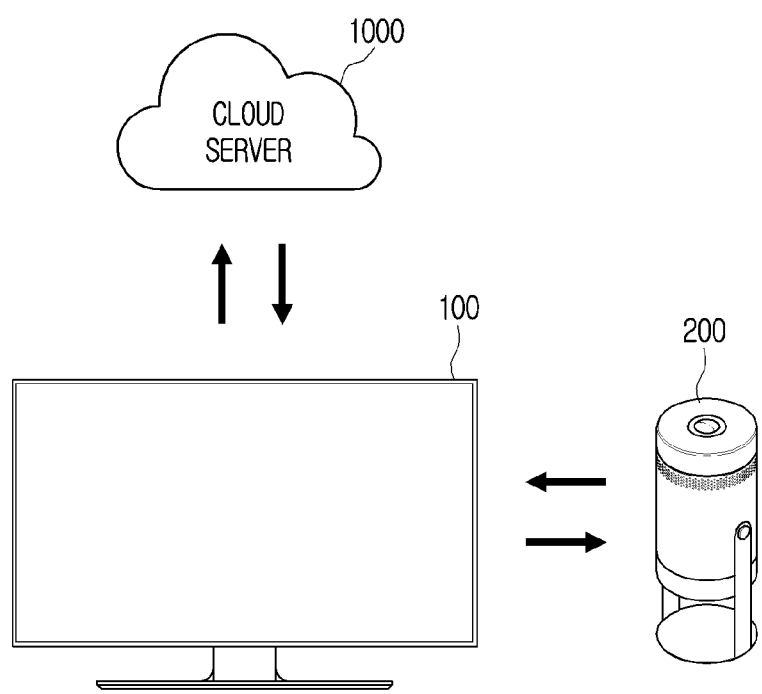
FIG. 3 is a diagram for illustrating communication among a display device, an image output device, and an external server according to one or more embodiments of the disclosure.

FIG. 3 is a diagram for illustrating communication among a display device, an image output device, and an external server, according to one or more embodiments of the disclosure.

Referring to FIG. 3, the communication interface 110 may transmit a signal for detecting an image output device 200 supporting the MSE mode, and receive a response signal from the image output device 200.

Here, the response signal may include device information of the image output device 200. The device information of the image output device 200 may include identification information of the image output device 200 (e.g., the model name, the product name, etc.), resolution information of a screen that may be provided through the image output device 200 (e.g., 4K, 8K, etc.), size information (e.g., inches, vertical and horizontal lengths, etc.), and the like.

Subsequently, when the content provided from the external server 1000 is selected, the processor 130 may transmit the device information of the image output device 200 (hereinafter "first device information") and the device information of the display device 100 (hereinafter "second device information") to the external server 1000.

The second device information may include identification information of the display device 100 (e.g., the model name, the product name, etc.), resolution information of a screen that may be provided through the display 120 (e.g., 4K, 8K, etc.), size information (e.g., inches, vertical and horizontal lengths, etc.), and any other suitable information known to one of ordinary skill in the art for implementing the MSE.

In one or more examples, external server 1000 may be an over-the-top (OTT) server providing various kinds of contents through the Internet, a server providing a cloud gaming service through the Internet, etc. The external server 1000 may be a server providing files in various forms (e.g., a video file, etc.) in real time through the Internet, or a server providing a streaming function, and thus, the external server 1000 may also be referred to as a cloud server, a streaming server, etc., but is generally referred to as an external server below, for the convenience of explanation.

The above described configuration is merely an example, and the disclosure is not limited thereto. For example, the processor 130 may receive a content (e.g., a media content, a game content, etc.) from the external server 1000, or acquire. or load, a content from storage media in various forms (e.g., an SSD, etc.) included in the display device 100.

When the first device information and the second device information are received from the display device 100, the external server 1000, according to one or more embodiments of the disclosure, may provide a content based on the first device information and the second device information. For example, when the first device information and the second device information are received from the display device 100, the external server 1000 may determine that a content may be provided by using both of the display device 100 and the image output device 200, and transmit a content in consideration of the resolution, the size, etc. of a maximum screen provided through the display device 100 and the image output device 200 to the display device 100. The maximum screen may correspond to the viewing area of the combined main screen and sub screen.

A content in consideration of the resolution, the size, etc. of a maximum screen provided through the display device 100 and the image output device 200 may be a content including a main screen image 10 provided through the display device 100 and a sub screen image 20 provided through the image output device 200.

For example, when the first device information and the second device information are received from the display device 100, the external server 1000 may acquire the main screen image 10 and the sub screen image 20 of the content requested by the display device 100. Subsequently, the external server 1000 may transmit the content including the main screen image 10 and the sub screen image 20 to the display device 100. The main screen image 10 may include at least one of a screen image corresponding to a first viewpoint set by the distributor, or the provider, of the content, a screen image including an object that may be controlled according to a user command, or a screen image corresponding to the original content.

The sub screen image 20 may include at least one of a screen image corresponding to a second viewpoint rotated by a specific angle based on the first viewpoint, a background screen image enlarging, or adding. the background constituting the main screen image 10, or a screen image including additional information for the content.

For example, if the content is a metabus content, a 3D content, a panorama content in a wide width, etc., a screen image corresponding to the first viewpoint set by the distributor, or the provider, of the content may be the main screen image 10, and an image for increasing the field of view (FOV) based on the first viewpoint may be the sub screen image 20.

According to one or more embodiments, by considering the cognitive properties of humans, the main screen image 10 may be an image of a relatively high resolution, and the sub screen image 20 may be an image of a relatively low resolution. For example, in the main screen image 10 corresponding to a narrow field of view, the texture of the image, etc. may be implemented in a high resolution (e.g., high definition, 4K, etc.), and in the sub screen image 20 corresponding to a wide field of view, the texture of the image, etc. may be implemented in a low resolution (e.g., low definition, standard definition, etc.).

In one or more examples, when the first device information and the second device information are received from the display device 100, the external server 1000 may upscale the resolution of the content based on the resolution of the maximum screen provided through the display device 100 and the image output device 200, and subsequently transmit the content to the display device 100.

In one or more examples, when the first device information and the second device information are received from the display device 100, the external server 1000 may resize the size of the content based on the size of the maximum screen provided through the display device 100 and the image output device 200, and after the resizing, transmit the content to the display device 100.

Subsequently, the display device 100 may control the display 120 to display the main screen image 10 included in the content received from the external server 1000, and control the communication interface 110 to transmit the sub screen image 20 to the image output device 200. Detailed explanation in this regard is described with reference to FIG. 4.

Figure 4:
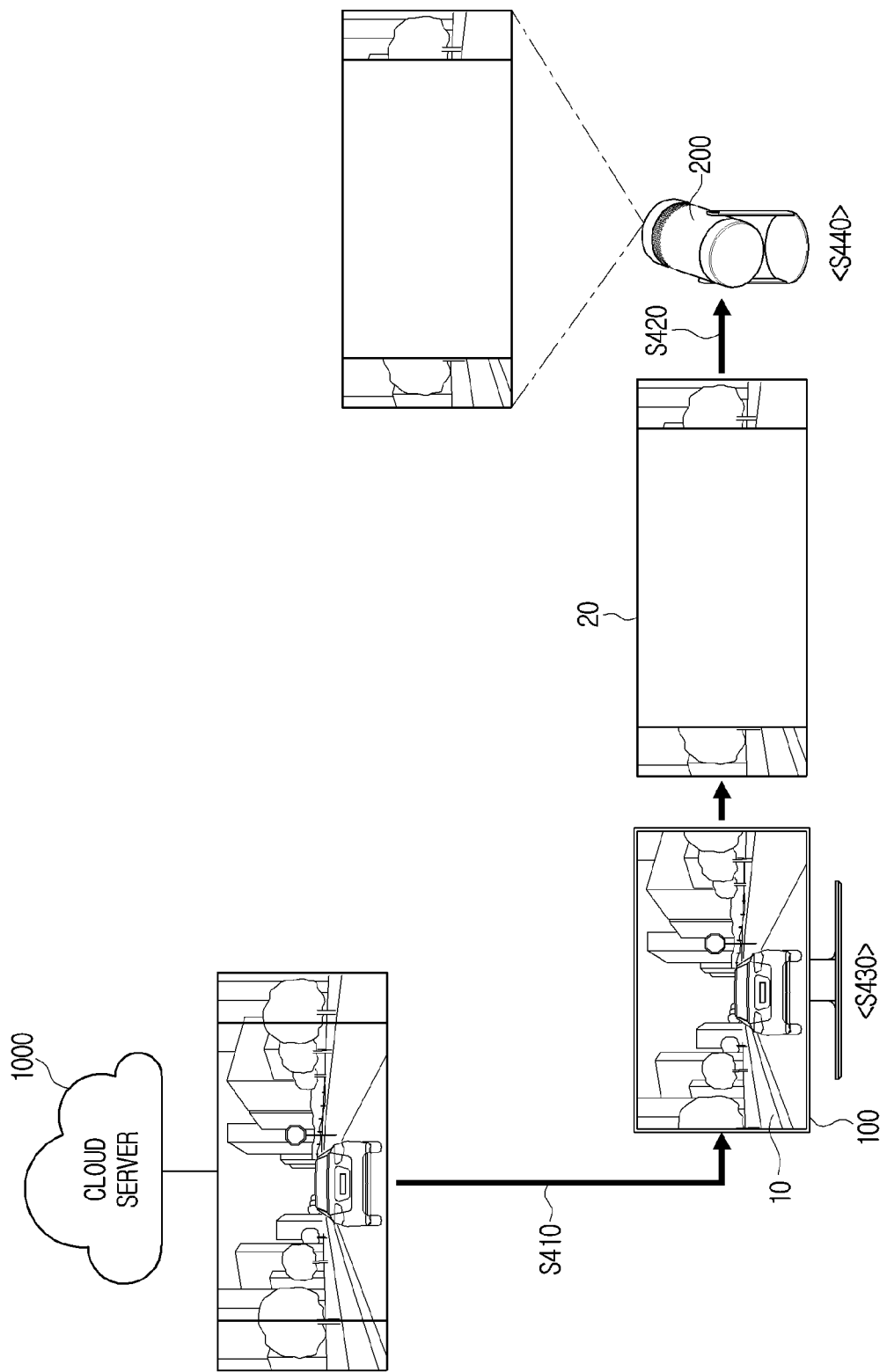
FIG. 4 is a diagram for illustrating a main screen image and a sub screen image according to one or more embodiments of the disclosure.

FIG. 4 is a diagram for illustrating the main screen image 10 and the sub screen image 20, according to one or more embodiments of the disclosure.

The display device 100 may transmit the first and second device information to the external server 1000 as described above with respect FIG. 1 to FIG. 3.

The external server 1000, according to one or more embodiments, may transmit a content according to a request of the display device 100 to the display device 100 in operation S410.

The content received by the display device 100 may be a content including a main screen image 10 and a sub screen image 20 in consideration of the first and second device information.

After receiving the content, the display device 100 may transmit the sub screen image 20 included in the content to the image output device 200 in operation S420.

After transmitting the sub screen image 20 to the image output device 200, the display device 100 may control the display 120 to display the main screen image 10 included in the content in operation S430, and the image output device 200 may display the sub screen image 20 in operation S440.

According to one or more embodiments, when the display device 100 displays the main screen image 10, and the image output device 200 displays the sub screen image 20, the content is provided in a big screen as illustrated in FIG. 1, and thus, the user may advantageously experience a high sense of immersion.

Figure 5:
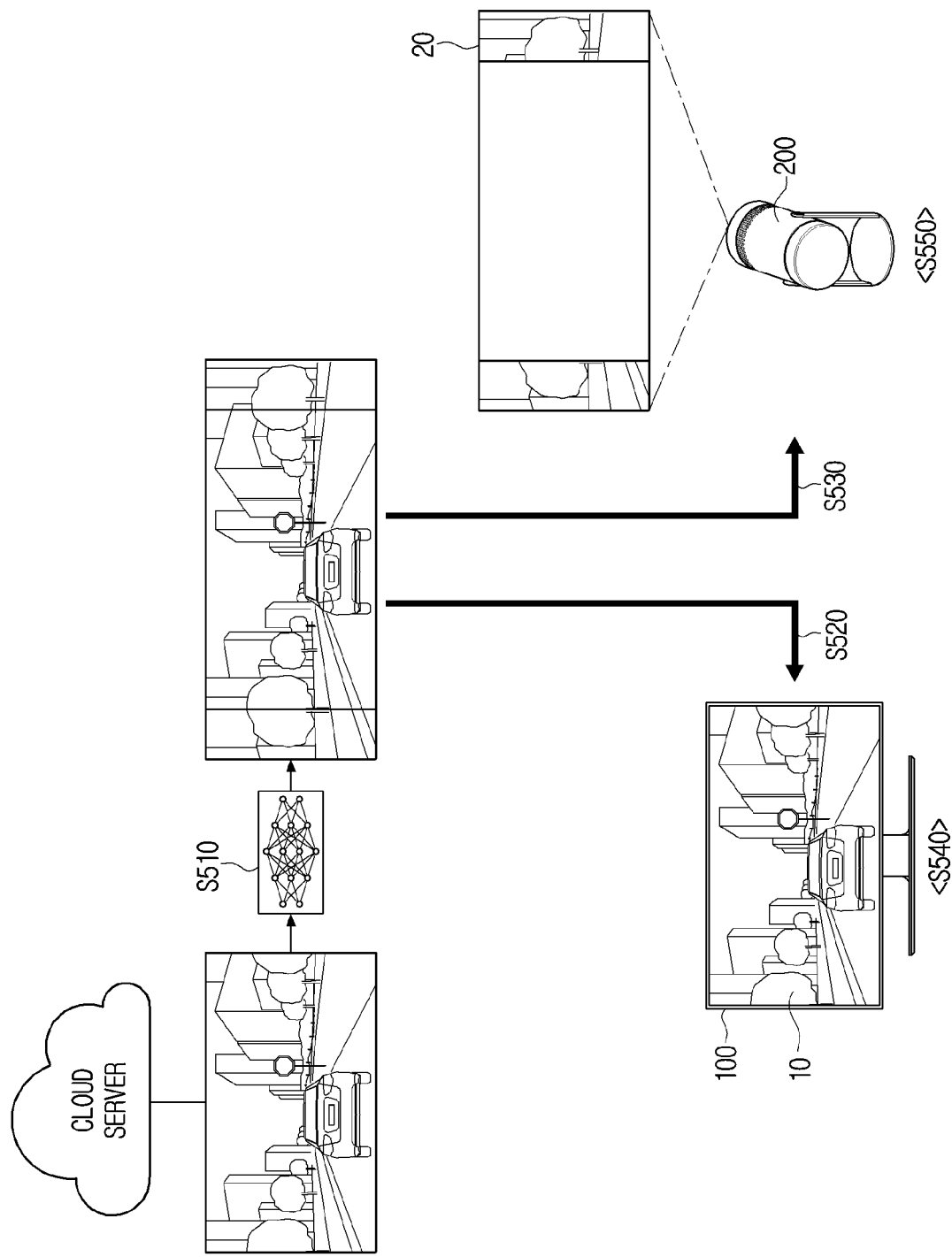
FIG. 5 is a diagram for illustrating a main screen image and a sub screen image according to one or more embodiments of the disclosure.

FIG. 5 is a diagram for illustrating a main screen image and a sub screen image according to one or more embodiments of the disclosure.

The external server 1000, according to one or more embodiments may transmit a content according to a request of the display device 100 to the display device 100. In one or more embodiments, a content received by the display device 100 may include only a main screen image 10.

For example, the external server 1000 may not store a content appropriate for the resolution, the size, etc. of the maximum screen provided through the display device 100 and the image output device 200. However, a case where the external server 1000 stores a content appropriate for the resolution or the size, etc. of a screen provided through the display device 100 (e.g., the resolution or the size, etc. of the display 120) may be assumed.

As the content received by the display device 100 does not include the sub screen image 20 in this case, the display device 100 may acquire, or generate, a sub screen image 20 by using the content received from the external server 1000.

In one or more examples, in case a content received from the external server 1000 does not include a sub screen image 20, the processor 130 may input the content into a neural network model, and acquire a sub screen image 20 corresponding to the content in operation S510.

The neural network model may be a model trained to identify an input image as a main screen image, and output a sub screen image corresponding to the main screen image.

In one or more examples, the neural network model may be a model trained to identify an input image as a main screen image, and enlarge the outer rim area of the main screen image and output a sub screen image.

In one or more examples, the neural network model may be a model trained to identify an input image as a main screen image, and upscale the main screen image based on the resolution of the maximum screen provided through the display device 100 and the image output device 200.

In one or more examples, the neural network model may be a model trained to identify an input image as a main screen image, and resize the main screen image based on the size of the maximum screen provided through the display device 100 and the image output device 200.

The display device 100, according to one or more embodiments of the disclosure, includes a memory that may store at least one neural network model.

The neural network model, according to one or more embodiments, may be a determination model trained based on a plurality of input images on the basis of an artificial intelligence algorithm, or any other learning model known to one of ordinary skill in the art. A trained determination model may be designed to simulate a human brain structure on a computer, and may include a plurality of network nodes having weight values, which simulate neurons of a human neural network. Each of the plurality of network nodes may form a connective relation to simulate synaptic activities of neurons, where the neurons transmit and receive signals through synapses. Furthermore, a trained determination model may include, for example, a machine learning model, a neural network model, or a deep learning model developed from a neural network model. In a deep learning model, a plurality of network nodes may be located in different depths, or layers from one another, and transmit and receive data according to a convolution connective relation.

In one or more examples, the neural network model may be a convolutional neural network (CNN) model trained based on images. A CNN may be a multi-layered neural network having a special connective structure designed for voice processing, image processing, etc. The neural network model is not limited to a CNN. For example, the neural network model may be implemented as at least one deep neural network (DNN) model among a recurrent neural network (RNN) model, a long short term memory network (LSTM) model, a gated recurrent units (GRU) model, a generative adversarial networks (GAN) model, or any other neural network model known to one of ordinary skill in the art.

In one or more examples, the neural network model may be a deep learning-based image outpainting and super resolutions model that can be utilized in the field of image completion and image restoration. The image outpainting and super resolutions model may be a model that continuously enlarges, or adds, the exterior, or the outer rim area, of an input image in consideration of the context and a feature of the input image. In one or more examples, the neural network model may also be a model that continuously enlarges, or adds, a feature to the outside based on the boundary feature of an input image. For example, an image may be enlarged by outpainting by extending the border of the image with one or more features that are predicted by a neural network model. In this regard, if the image is a forest, the outpainting may add additional trees to the image to enlarge the trees.

Functions related to artificial intelligence, according to one or more embodiments of the disclosure, are operated through the processor 130 and the memory. The processor 130 may consist of one or a plurality of processors. The one or plurality of processors may be generic-purpose processors like CPUs, APs, and digital signal processors (DSPs), graphic-dedicated processors like GPUs and vision processing units (VPUs), or artificial intelligence-dedicated processors like NPUs. The one or plurality of processors may perform control such that input data is processed according to a predefined operation rule stored in the memory or an artificial intelligence model. In one or more examples, in case the one or plurality of processors are artificial intelligence-dedicated processors, the artificial intelligence-dedicated processors may be designed as a hardware structure specified for processing of a specific artificial intelligence model.

The predefined operation rule or the artificial intelligence model may be made through learning. Being made through learning may refer to training a basic artificial intelligence model by using a plurality of learning data by a learning algorithm, and a predefined operation rule or an artificial intelligence model may be set to perform a desired characteristic, or purpose. Such learning may be performed in a device where artificial intelligence is performed itself, according to the disclosure, or performed through a separate server and/or system. In one or more examples of learning algorithms, there may be supervised learning, unsupervised learning, semi-supervised learning, or reinforcement learning. The learning algorithms are not limited to the aforementioned examples, and may include any other suitable learning algorithm known to one of ordinary skill in the art.

The artificial intelligence model may consist of a plurality of neural network layers. Each of the plurality of neural network layers may have a plurality of weight values, and perform a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized. The artificial neural network may include a deep neural network (DNN), and there are, for example, a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, etc. The artificial neural network is not limited to the aforementioned examples, and may include any other suitable learning algorithm known to one of ordinary skill in the art.

FIG. 5 is illustrated based on the assumption that the processor 130 acquires a sub screen image 20 by using the neural network model. However, this configuration merely an example, and the disclosure is not limited thereto. In one or more examples, in FIG. 4, the external server 1000 may acquire a sub screen image 20 by using the neural network model, and subsequently transmit the content including the main screen image 10 and the sub screen image 20 to the display device 100.

After receiving the content, the display device 100 may acquire the main screen image 10 in the content in operation S520, and transmit the sub screen image 20 in the content to the image output device 200 in operation S530.

After the operation S530, the display device 100 may control the display 120 to output the main screen image 10 in operation S540, and the image output device 200 may control a projection lens, etc. included in the image output device 200 to output the sub screen image 20 in operation S550.

According to one or more embodiments of the disclosure, the processor 130 may acquire a layout arrangement including information on the main screen and sub screen, and in response to a content provided from the external server being selected, the processor 130 may additionally transmit the layout arrangement to the external server in addition to the first and second device information.

Detailed explanation regarding the layout arrangement will be described with reference to FIG. 6 and FIG. 7.

Figure 6:
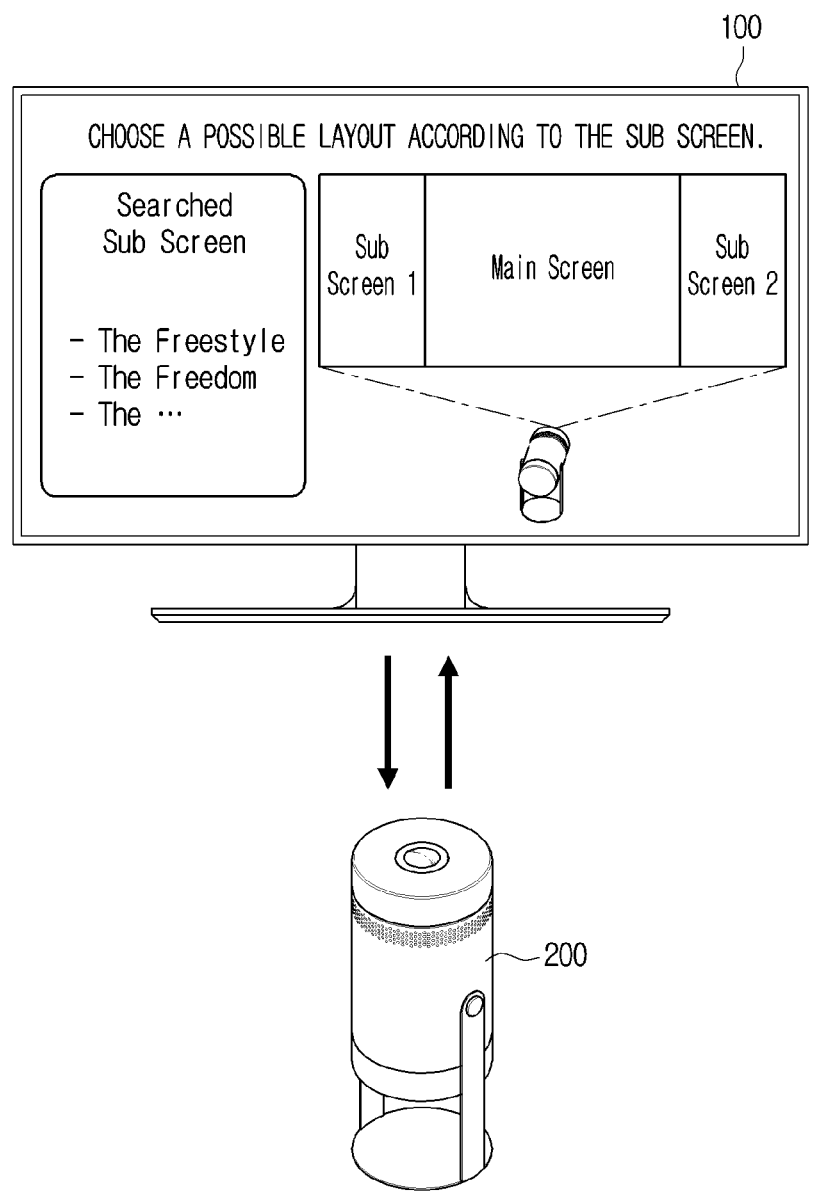
FIG. 6 is a diagram for illustrating a UI screen for selecting a layout arrangement, according to one or more embodiments of the disclosure.

FIG. 6 is a diagram for illustrating a UI screen for selecting a layout arrangement, according to one or more embodiments of the disclosure.

Referring to FIG. 6, the processor 130 may provide a UI screen for selecting any one of a plurality of layout arrangements based on the first device information and the second device information.

The processor 130, according to one or more embodiments of the disclosure, may include information on image output devices 200 that are adjacent to the display device 100, and support the MSE mode (e.g., a list for image output devices 200) in the UI screen based on a response signal received from the image output device 200.

For example, the processor 130 may display a list for image output devices 200 that can output a sub screen image 20 in one area inside the UI screen under a title of 'Searched Sub Screen,' etc.

When an image output device 200 is selected in the list according to a user command, the processor 130 may identify a plurality of layout arrangements based on the first device information of the selected image output device 200 and the second device information of the display device 100, and provide a UI screen for selecting any one of the plurality of layout arrangements. The selection of a layout arrangement may be based on parameters of the display device 100 and image output device 200 such as resolution and/or display size.

According to one or more embodiments of the disclosure, each of the plurality of layout arrangements may include information on an arrangement state of the main screen image 10 (e.g., the main screen) and the sub screen image 20 (e.g., the sub screen). The arrangement state may include information regarding a position of the main screen image and a position of the sub screen image.

FIG. 6 illustrates an arrangement state according to a layout arrangement among the plurality of layout arrangements, and according to one or more embodiments, a screen that may be provided through the display device 100 (e.g., the main screen) may be located in the center, and a screen that may be provided through the image output device 200 (e.g., the sub screen) may be located on the left side and the right side based on the main screen.

Figure 7:
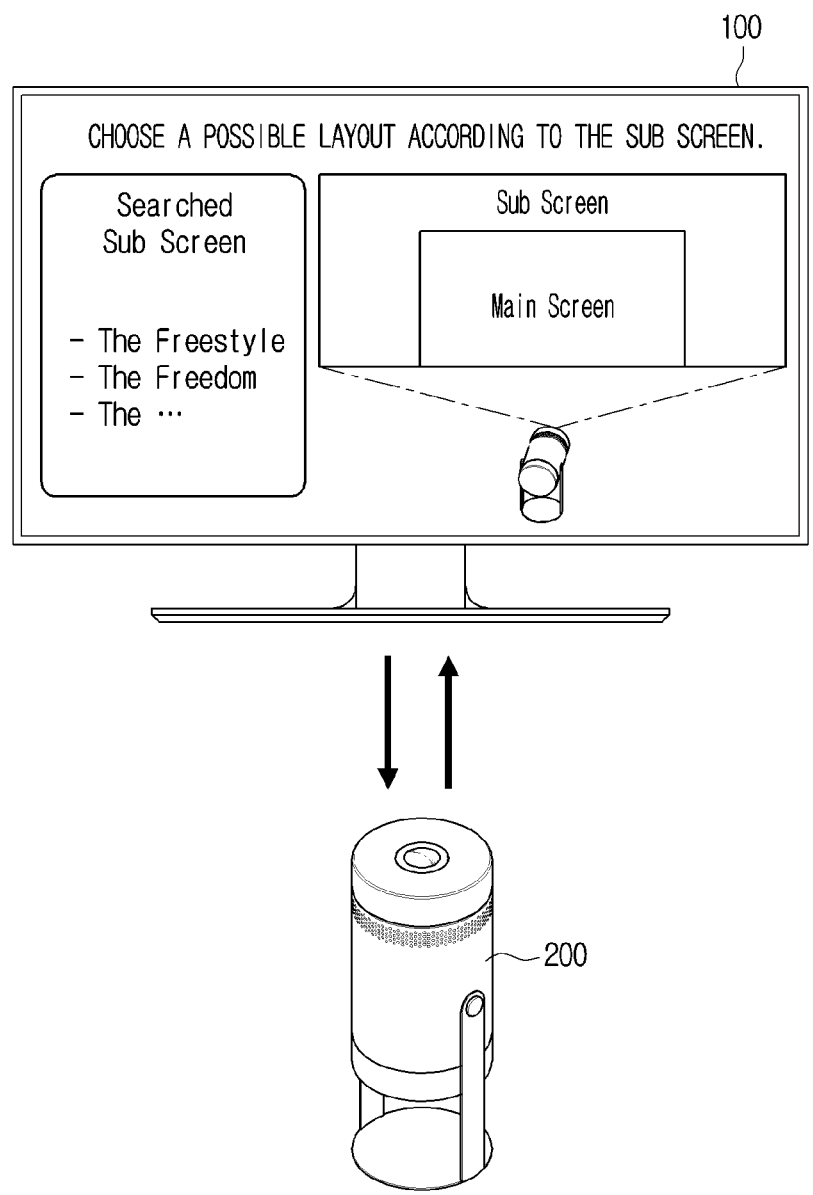
FIG. 7 is a diagram for illustrating a UI screen for selecting a layout arrangement according to one or more embodiments of the disclosure.

FIG. 7 is a diagram for illustrating a UI screen for selecting a layout arrangement according to one or more embodiments of the disclosure.

FIG. 7 illustrates an arrangement state according to a different layout arrangement from the layout arrangement illustrated in FIG. 6 among the plurality of layout arrangements.

According to one or more embodiments of a layout arrangement, a screen that may be provided through the display device 100 (e.g., the main screen) may be located in the center, and a screen that may be provided through the image output device 200 (e.g., the sub screen) may be located to surround the left side, the upper side, and the right side based on the main screen.

This layout arrangement is merely an example, and the arrangement state of the main screen image 10 (e.g., the main screen) and the sub screen image 20 (e.g., the sub screen) may be changed in various ways, and any one among various arrangement states can be selected according to a user command.

Figure 8A:
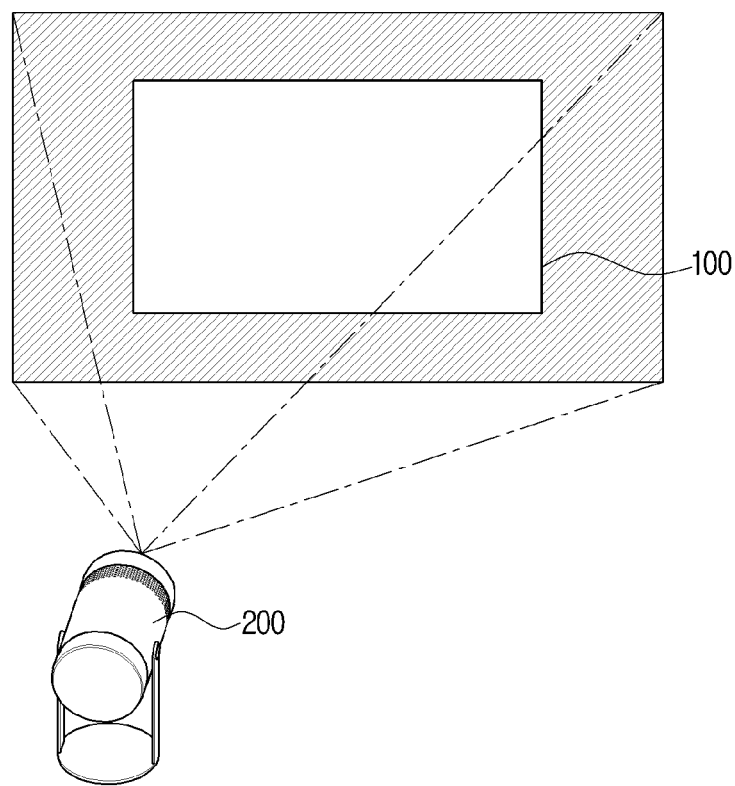
FIG. 8A is a diagram for illustrating an arrangement state of a main screen image and a sub screen image according to one or more embodiments of the disclosure.

FIG. 8A is a diagram for illustrating an arrangement state of a main screen image and a sub screen image, according to one or more embodiments of the disclosure.

As illustrated in FIG. 1 and FIG. 8A, according to a layout arrangement among the plurality of layout arrangements, a screen that may be provided through the display device 100 (e.g., the main screen) may be located in the center, and a screen that may be provided through the image output device 200 (e.g., the sub screen) may be located to surround the left side, the upper side, the right side, and the lower side based on the main screen.

Figure 8B:
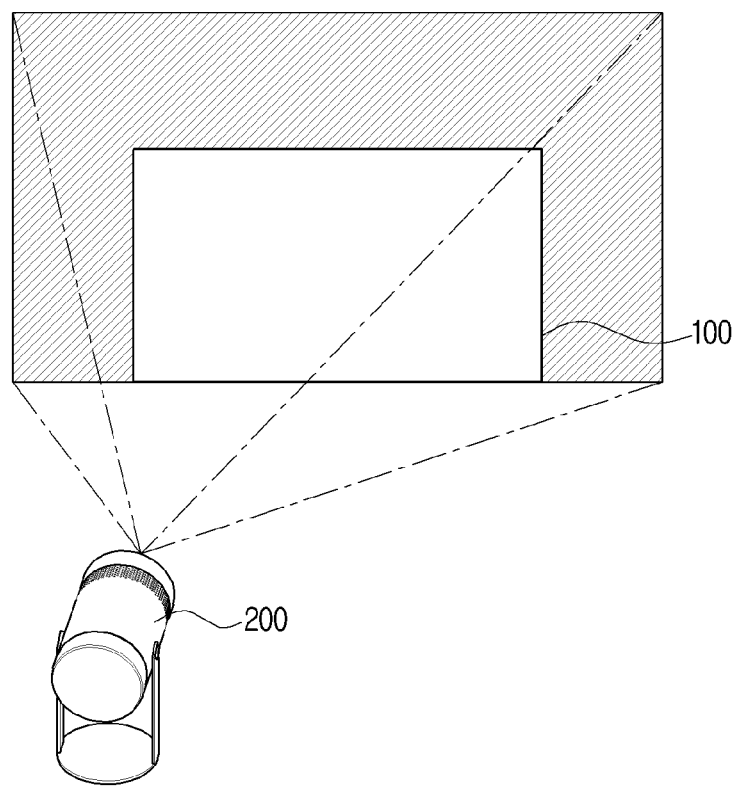
FIG. 8B is a diagram for illustrating an arrangement state of a main screen image and a sub screen image according to one or more embodiments of the disclosure.

FIG. 8B is a diagram for illustrating an arrangement state of a main screen image and a sub screen image according to one or more embodiments of the disclosure.

As illustrated in FIG. 7 and FIG. 8B, according to a layout arrangement among the plurality of layout arrangements a screen that may be provided through the display device 100 (e.g., the main screen) may be located in the center, and a screen that may be provided through the image output device 200 (e.g., the sub screen) may be located to surround the left side, the upper side, and the right side based on the main screen.

Figure 8C:
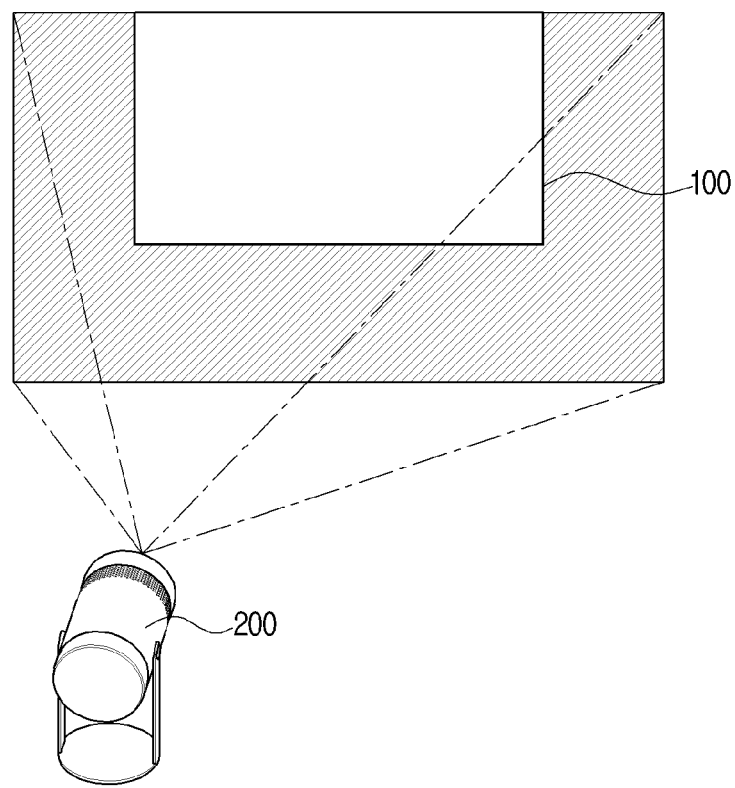
FIG. 8C is a diagram for illustrating an arrangement state of a main screen image and a sub screen image according to one or more embodiments of the disclosure.

FIG. 8C is a diagram for illustrating an arrangement state of a main screen image and a sub screen image, according to one or more embodiments of the disclosure.

As illustrated in FIG. 8C, according to a layout arrangement among the plurality of layout arrangements, a screen that may be provided through the display device 100 (e.g., the main screen) may be located in the center, and a screen that may be provided through the image output device 200 (e.g., the sub screen) may be located to surround the left side, the lower side, and the right side based on the main screen.

Figure 8D:
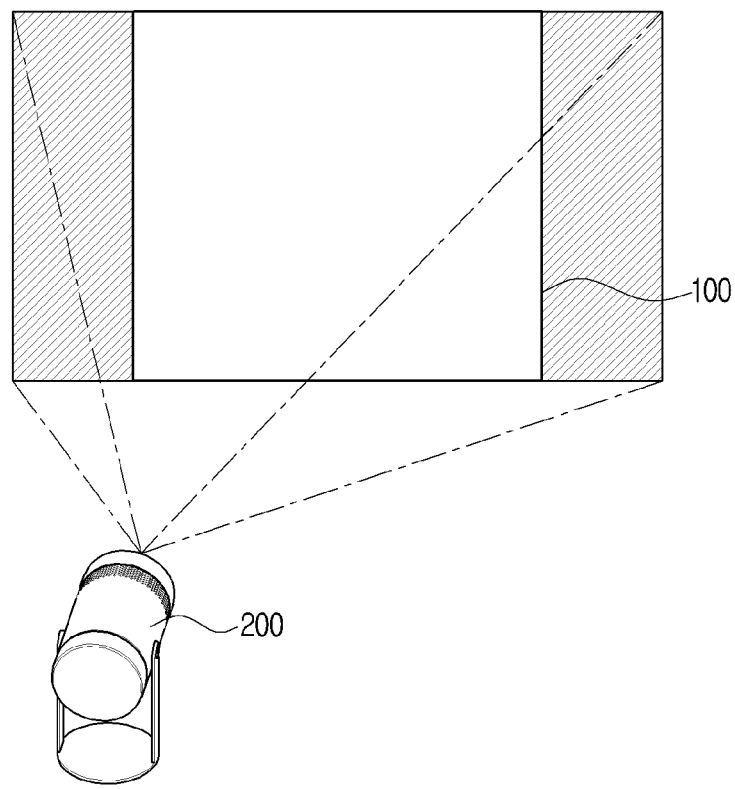
FIG. 8D is a diagram for illustrating an arrangement state of a main screen image and a sub screen image according to one or more embodiments of the disclosure.

FIG. 8D is a diagram for illustrating an arrangement state of a main screen image and a sub screen image, according to one or more embodiments of the disclosure.

As illustrated in FIG. 4, FIG. 6, and FIG. 8D, according to a layout arrangement among the plurality of layout arrangements, a screen that may be provided through the display device 100 (e.g., the main screen) may be located in the center, and a screen that may be provided through the image output device 200 (e.g., the sub screen) may be located on the left side and the right side based on the main screen (e.g., the sub screen is located on opposite sides of the main screen).

Figure 8E:
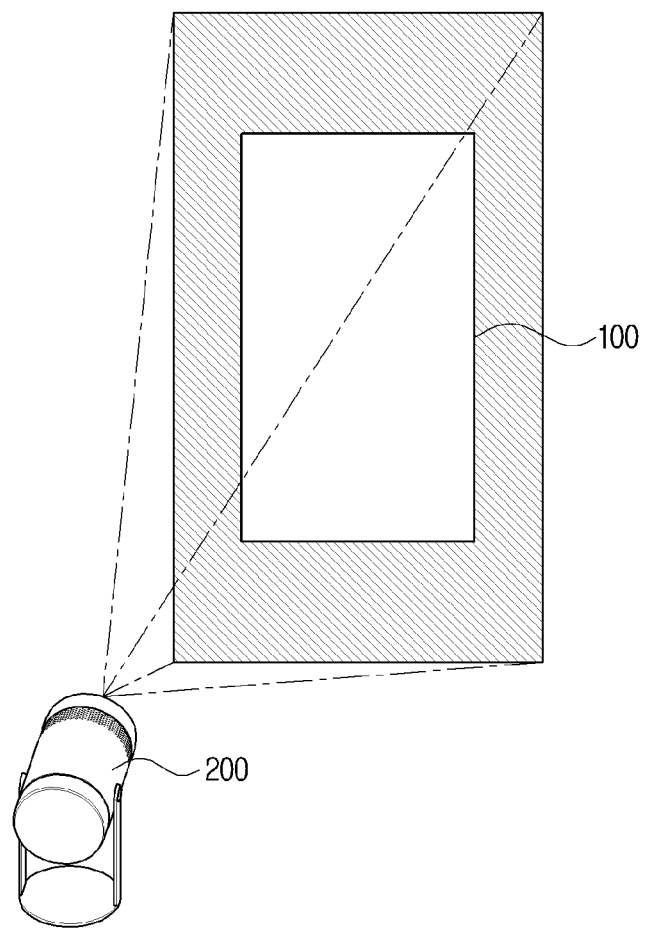
FIG. 8E is a diagram for illustrating an arrangement state of a main screen image and a sub screen image according to one or more embodiments of the disclosure.

FIG. 8E is a diagram for illustrating an arrangement state of a main screen image and a sub screen image, according to one or more embodiments of the disclosure. Particularly, FIG. 8E illustrates a configuration in which a height of the display device 100 is greater than a width of the display device 100. As illustrated in FIG. 8E, the display device 100 (e.g., the main screen) is surrounded on the left, right, top, and bottom by a screen provided through the image output device 200 (e.g., the sub screen).

FIG. 8A to FIG. 8D are illustrated based on the assumption of a case where the display device 100 is arranged in a horizontal direction, but as illustrated in FIG. 8E, the display device 100 may be arranged in a vertical direction.

Furthermore, FIG. 8A to FIG. 8E are illustrated based on the assumption that the width of the sub screen image 20 is in a symmetrical form based on the center of the main screen image 10, for the convenience of explanation. This configuration is merely an example, and the disclosure is not limited thereto.

For example, as illustrated in FIG. 8D, as understood by one of ordinary skill in the art, the sizes of the first sub screen (Sub screen 1) and the second sub screen (Sub screen 2) that are respectively located on the left side and the right side based on the main screen image 10 may be the same, or may be different.

According to one or more embodiments of the disclosure, when any one of the plurality of layout arrangements is selected, the processor 130 may transmit the first and second device information and the selected layout arrangement to the external server 1000, and receive a content including a main screen image 10 and a sub screen image 20 based on the selected layout arrangement from the external server 1000.

When any one of the plurality of layout arrangements is selected, the processor 130, according to one or more embodiments, may adjust the resolution of the main screen image 10 based on the arrangement state included in the selected layout arrangement and the resolution information of the display 120 included in the second device information. Furthermore, the processor 130 may adjust the resolution of the sub screen image 20 based on the arrangement state included in the selected layout arrangement, and the resolution information of the image output device 200 included in the first device information.

In one or more examples, when any one of the plurality of layout arrangements is selected, the processor 130 may identify the size of a maximum screen provided through the display 120 and the image output device 200 based on the arrangement state included in the selected layout arrangement. After selection of the layout arrangement, the processor 130 may adjust the sizes of the main screen image 10 and the sub screen image 20 based on the identified size of the maximum screen.

The processor 130 may control the image output device 200 such that the sub screen image 20 is displayed in the outside area of the display 120 based on the arrangement state included in the selected layout arrangement.

For example, the processor 130 may control the image output device 200 such that the sub screen image 20 is displayed in the outside area of the display 120 such that the main screen image 10 and the sub screen image 20 do not overlap as the sub screen image 20 is displayed in the inside area of the display 120.

Figure 9:
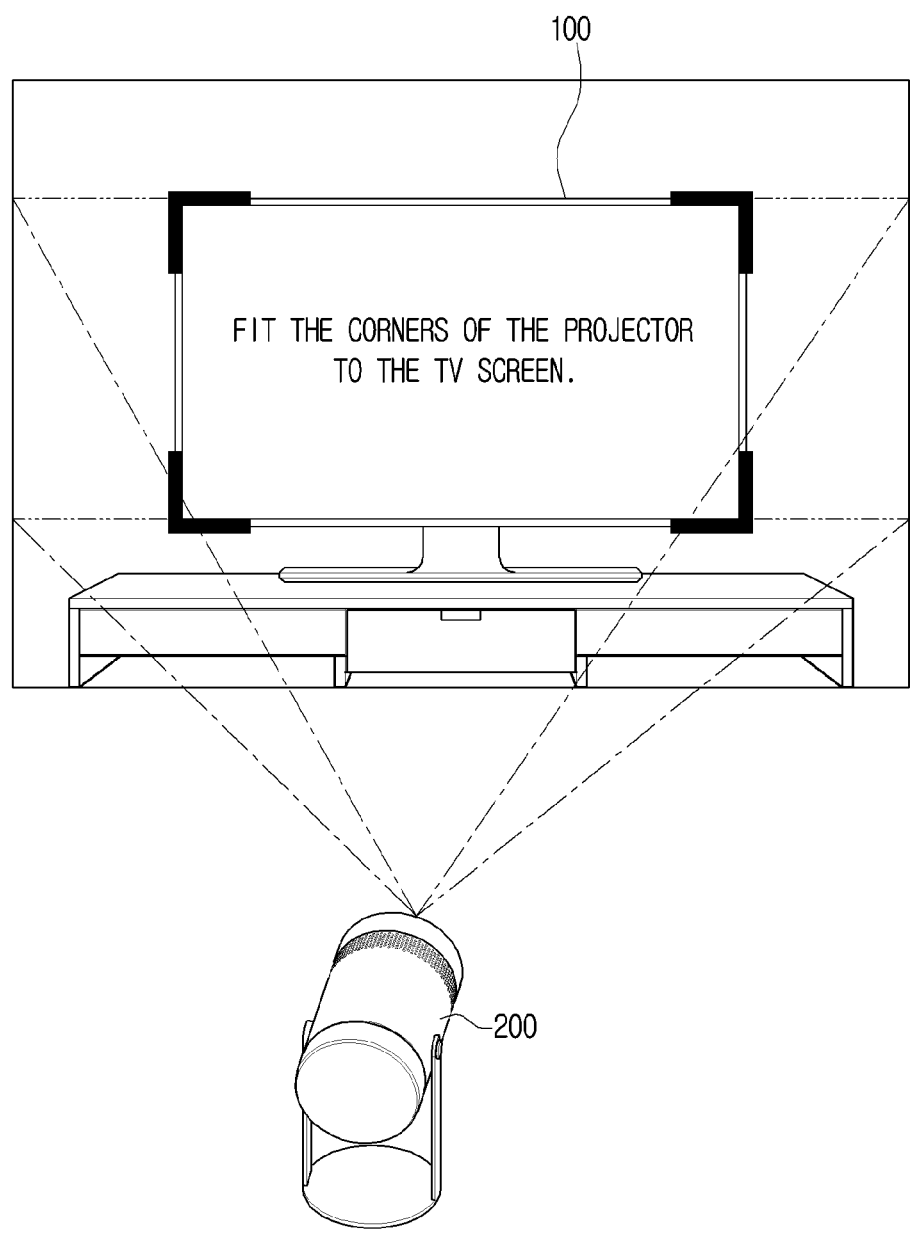
FIG. 9 is a diagram for illustrating a guide image according to one or more embodiments of the disclosure.

FIG. 9 is a diagram for illustrating a guide image according to one or more embodiments of the disclosure.

As illustrated in FIG. 6 and FIG. 7, when any one of the plurality of layout arrangements is selected, the processor 130 may acquire a guide image for adjusting a set value of any one of the display device 100 or the image output device 200, according to the selected layout arrangement.

Referring to FIG. 9, the processor 130 may control the image output device 200 to output a guide image for identifying the outer rim area of the display 120.

In case the display device 100 displays the main screen image 10, and the image output device 200 displays the sub screen image 20, there is no distanced space between the main screen image 10 and the sub screen image 20, and the sub screen image 20 displayed by the image output device 200 may be continued with the outer rim area of the main screen image 10, or may be continued with the bezel area of the display device 100 (i.e., seamless).

According to one or more embodiments, the processor 130 may acquire a guide image for identifying the outer rim area, or the corner of the display 120, and transmit the guide image to the image output device 200.

The guide image may include objects for identifying the outer rim area of the display 120, such as, the four corners (e.g., the upper left end, the lower left end, the upper right end, the lower right end).

As illustrated in FIG. 9, according to one or more embodiments, a user may move the image output device 200 and match the outer rim area of the display 120 with the objects included in the guide image, but the disclosure is not limited thereto.

For example, the image output device 200 may include a camera, and the image output device 200 may match the objects included in the guide image and the outer rim area of the display 120 as the camera automatically adjusts a set value (e.g., a set value for adjusting the location wherein the guide image is output, etc.) based on the guide image and an image that photographed the display 120.

Figure 10:
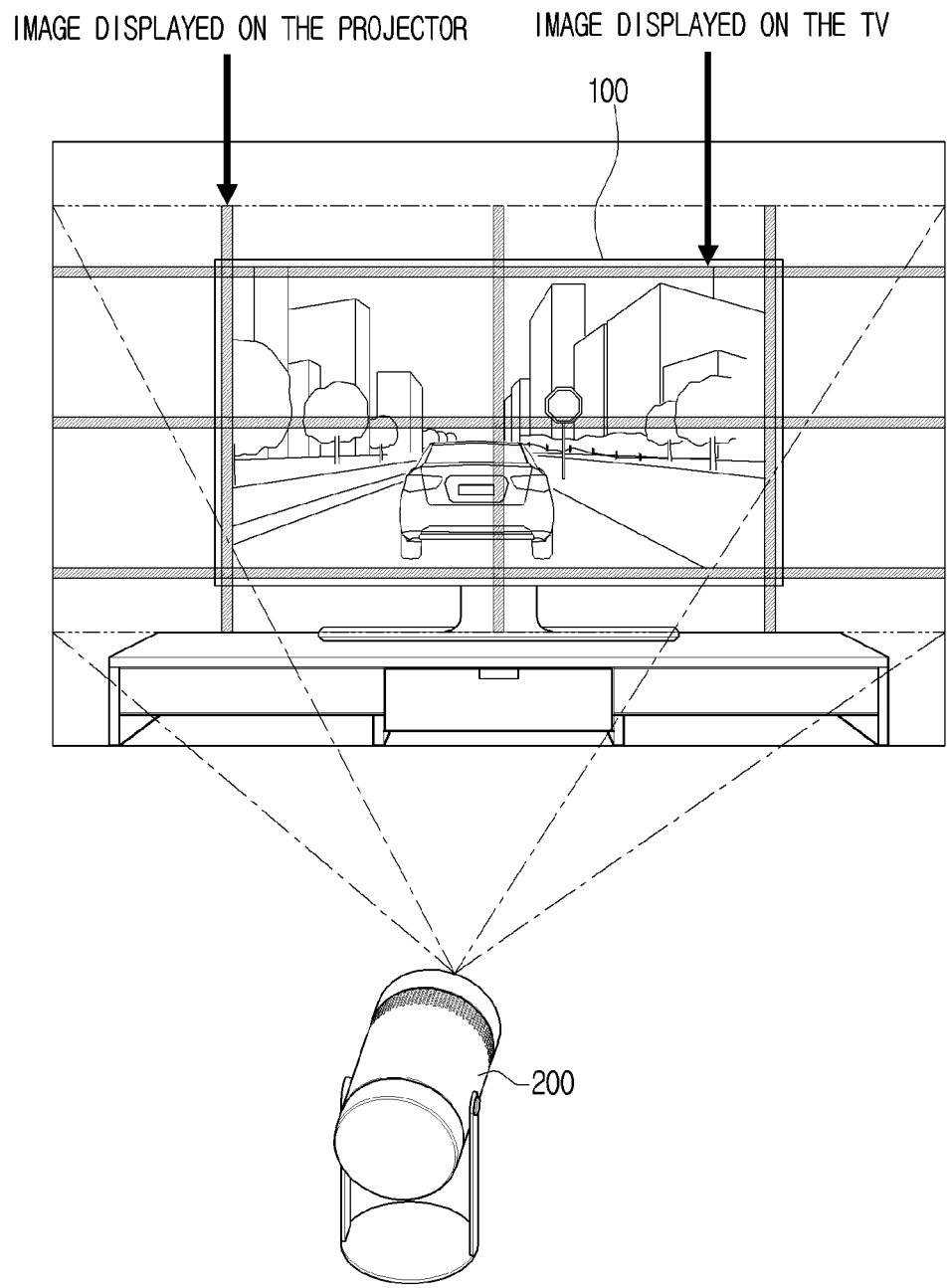
FIG. 10 is a diagram for illustrating a guide image according to one or more embodiments of the disclosure.

FIG. 10 is a diagram for illustrating a guide image according to one or more embodiments of the disclosure.

In addition to the guide image illustrated in FIG. 9, the processor 130 may acquire a first guide image for identifying the outer rim area of the display 120, and a second guide image for identifying the location of an image output through the image output device 200.

The first guide image may include an object (e.g., a straight line) for identifying the center area and the outer rim area of the display 120, as illustrated in FIG. 10.

Furthermore, the second guide image may include an object (e.g., a straight line) to coincide with the object (e.g., a straight line) included in the first guide image, as illustrated in FIG. 10.

As described above, a user may make the object (e.g., a straight line) included in the first guide image and the object (e.g., a straight line) included in the second guide image coincide by moving the image output device 200, or adjusting the set value of the image output device 200. This configuration is merely an example, and the disclosure is not limited thereto.

In one or more examples, the image output device 200 may photograph the display 120 that is providing the first guide image and the second guide image by using the camera, and may make the object (e.g., a straight line) included in the first guide image and the object (e.g., a straight line) included in the second guide image coincide by automatically adjusting the set value based on the images photographed by the camera.

According to one or more embodiments, the processor 130 may adjust the set value of any one of the display device 100 or the image output device 200 such that non-uniformity of the luminance and the colors of the main screen image 10 and the sub screen image 20 does not occur by using the first guide image and the second guide image.

As an example, the processor 130 may control the display 120 to display a first guide image including an object in a red (R) color. Furthermore, the processor 130 may transmit a second guide image including an object in a red (R) color to the image output device 200.

After the second guide image is transmitted, the image output device 200 may photograph the display 120 that is providing the first guide image and the second guide image by using the camera, and adjust the set values for the luminance and the colors based on the images photographed by the camera, thereby advantageously minimizing occurrence of non-uniformity of the luminance and the colors between the main screen image 10 and the sub screen image 20.

After the image output device 200 photographs the display 120, the processor 130 may control the display 120 to display a first guide image including an object in a green (G) color, and transmit a second guide image including an object in a green (G) color to the image output device 200.

Subsequently, the processor 130 may control the display 120 to display a first guide image including an object in a blue (B) color, and transmit a second guide image including an object in a blue (B) color to the image output device 200.

The aforementioned colors and order (e.g., the order of R, G, and B colors), etc. are merely an example, and the embodiments of the disclosure may utilize any suitable color scheme known to one of ordinary skill in the art.

Figure 11:
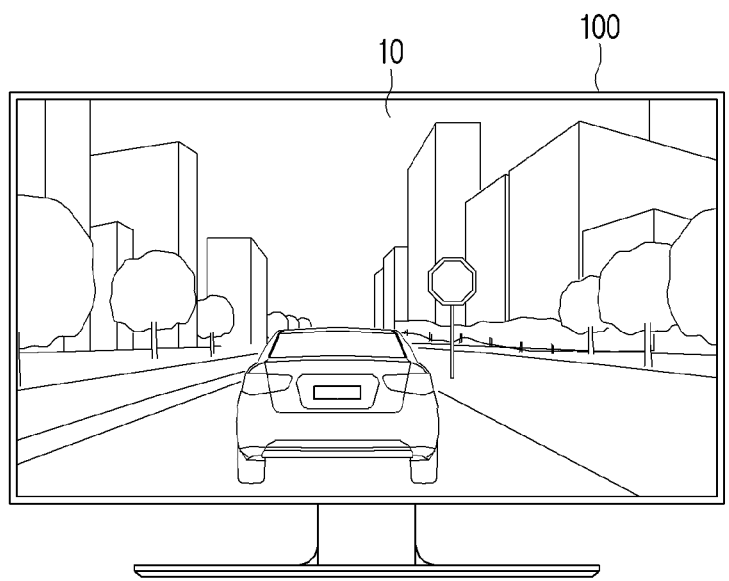
FIG. 11 is a diagram for illustrating a display device providing a content according to a conventional technology.

FIG. 11 is a diagram for illustrating a display device providing a content according to a conventional technology.

FIG. 11 is illustrated based on the assumption of a case where a content is provided by using only the display device 100 according to a conventional technology.

Based on the conventional technology, since a content may not be provided by using another screen other than a screen provided by the display 120 included in the display device 100, the sense of immersion that a user may experience is limited.

Figure 12:
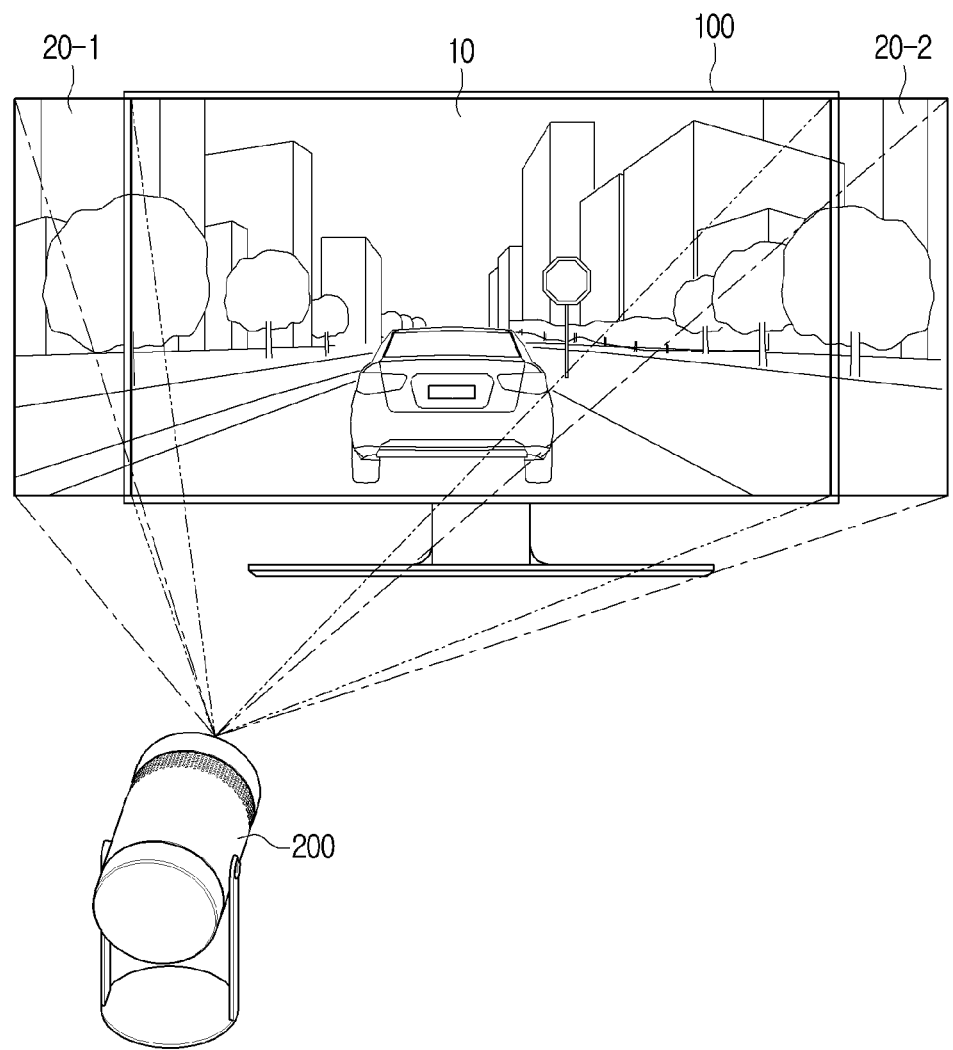
FIG. 12 is a diagram for illustrating operations of a display device providing a content and an image output device according to one or more embodiments of the disclosure.

FIG. 12 is a diagram for illustrating operations of a display device providing a content and an image output device according to one or more embodiments of the disclosure.

If a content is provided by using another screen other than a screen provided by the display 120 included in the display device 100, according to the various embodiments of the disclosure, there is an effect that the sense of immersion that a user can experience may be advantageously improved.

For example, the image output device 200 may display a first sub screen image 20-1 and a second sub screen image 20-2 on each of the left side and the right side of the display 120.

According to one or more embodiments of the disclosure, a content may be provided by increasing a resolution or size of the content, and thus, there is an effect that the sense of immersion of a user may be advantageously improved in a multi-screen environment.

Furthermore, according to a conventional technology, if the ratio of a content (e.g., 4:3, 16:9, 21:9, 32:9, etc.) was different from the ratio of the display 120, black bars may be generated in the upper area and the lower area inside the display 120 for maintaining the ratio of the content.

As the size of the screen on which the content was provided decreased due to such black bars, there is a problem that the sense of immersion of a user may be interrupted.

If the ratio of a content is different from the ratio of the display 120, the processor 130, according to one or more embodiments of the disclosure, may enlarge the content while maintaining the ratio of the content.

After the content is enlarged, the processor 130 may output some areas exceeding the size of the display 120 due to the enlarged content as the sub screen image 20 in the outer rim area of the display 120 by using the image output device 200.

Thus, according to the various embodiments of the disclosure, black bars may not be generated in the upper area and the lower area inside the display 120 for maintaining the ratio of a content, and as an enlarged content is provided while maintaining the ratio of the content, there is an effect that the sense of immersion of a user may be advantageously improved.

Figure 13:
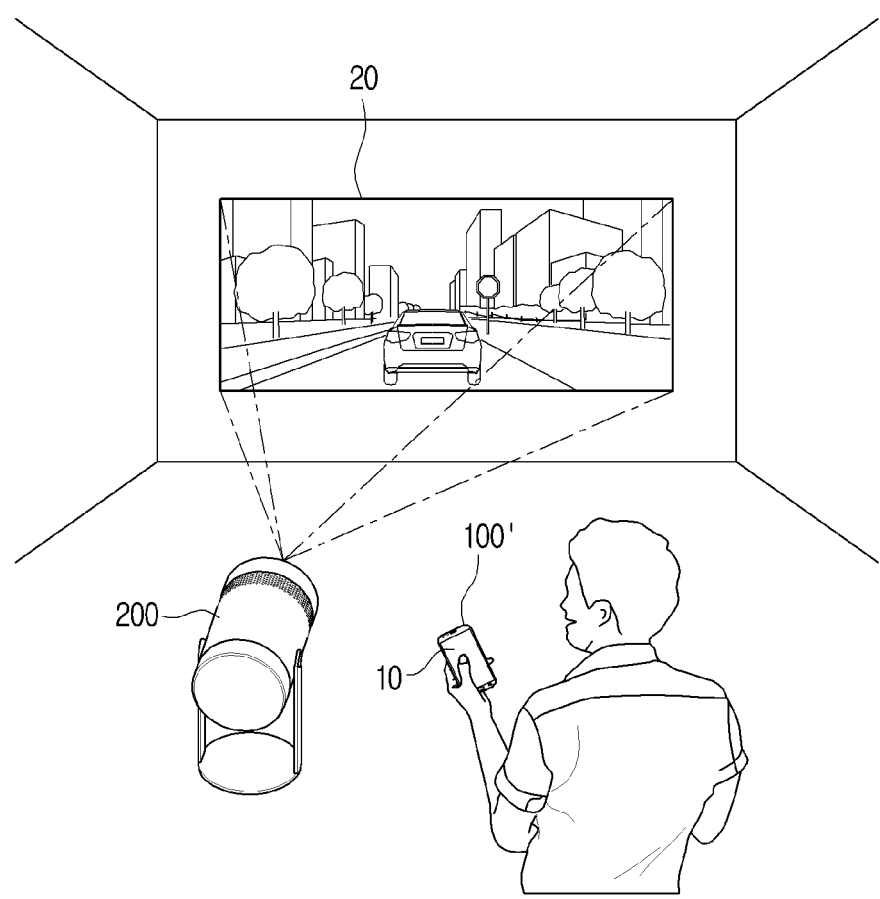
FIG. 13 is a diagram for illustrating operations of a display device providing a content and an image output device according to one or more embodiments of the disclosure.

FIG. 13 is a diagram for illustrating operations of a display device providing a content and an image output device according to one or more embodiments of the disclosure.

Referring to FIG. 13, the display device 100 is not limited to a TV equipped in a home, and may be implemented as a user terminal device 100'. The user terminal 100' may be a smartphone, tablet, laptop, etc.

In one or more examples, if the user terminal device 100' is providing a game content, the image output device 200 may display a sub screen image 20 including additional information related to the game content.

The image output device 200 does not enlarge and output the game content that is being provided by the user terminal device 100' like the conventional mirroring function, but the image output device 200 may output a sub screen image 20 related to the game content that is being provided by the user terminal device 100' (e.g., the background screen image inside the game content that is being provided by the user terminal device 100').

According to one or more embodiments, the game content that is being provided by the user terminal device 100' (e.g., the main screen image 10) and the sub screen image 20 that is being provided by the image output device 200 relate to the same content, but they are not the same image.

Figure 14:
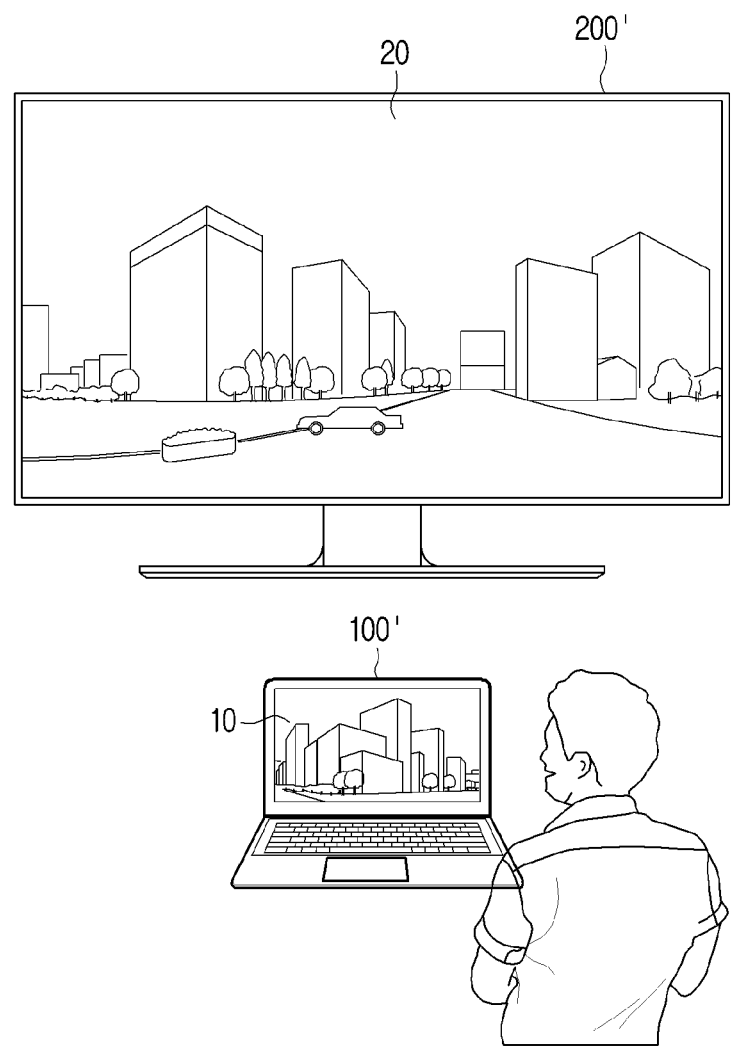
FIG. 14 is a diagram for illustrating operations of a display device providing a content and an image output device according to one or more embodiments of the disclosure.

FIG. 14 is a diagram for illustrating operations of a display device providing a content and an image output device according to still one or more embodiments of the disclosure.

Referring to FIG. 14, the display device 100 is not limited to a TV, etc. equipped in a home, and may be implemented as a portable computer 100', etc.

Furthermore, the image output device 200' is not limited to a projector device, and may be implemented as display devices in various forms such as a TV, etc. equipped in a home.

According to one or more embodiments, the content provided by the portable computer 100' (e.g., the main screen image 10) and the sub screen image 20 that is being provided by the image output device 200' relate to the same content, but they are not the same image.

FIG. 15 is a flow chart for illustrating a control method of a display device according to one or more embodiments of the disclosure.

According to one or more embodiments of the disclosure for achieving the aforementioned purpose of the disclosure, when an image output device is connected, first device information of the image output device is acquired in operation S1510.

When a content provided from an external server is selected, the first device information and second device information of the display device are transmitted to the external server in operation S1520.

After content is selected, when a content including a main screen image and a sub screen image is received from the external server, the main screen image is displayed in operation S1530.

After the main screen image is displayed, the sub screen image is transmitted to the image output device such that the image output device outputs the sub screen image in operation S1540.

The control method, according to one or more embodiments of the disclosure, may further include the step of providing a UI screen for selecting any one of a plurality of layout arrangements based on the first device information and the second device information of the display device, and each of the plurality of layout arrangements may include information on an arrangement state of the main screen image and the sub screen image.

The control method, according to one or more embodiments of the disclosure, may further include the steps of, based on any one of the plurality of layout arrangements being selected, adjusting the resolution of the main screen image based on an arrangement state included in the selected layout arrangement and resolution information of the display included in the second device information, and adjusting the resolution of the sub screen image based on the arrangement state and resolution information of the image output device included in the first device information.

The operation S1540 of transmitting to the image output device may include the step of controlling the image output device such that the sub screen image is displayed in an outside area of the display identified based on the information on the arrangement state.

The control method according to one or more embodiments of the disclosure may further include the steps of, based on any one of the plurality of layout arrangements being selected, acquiring a first guide image for identifying an outer rim area of the display and a second guide image for identifying the location of an image output through the image output device based on an arrangement state included in the selected layout arrangement, displaying the first guide image, and transmitting the second guide image to the image output device.

The control method according to one or more embodiments of the disclosure may further include the steps of, based on any one of the plurality of layout arrangements being selected, identifying the size of a maximum screen provided through the display and the image output device based on an arrangement state included in the selected layout arrangement, and adjusting the sizes of the main screen image and the sub screen image based on the identified size of the maximum screen.

The control method according to one or more embodiments of the disclosure may further include the step of, based on the content received from the external server not including a sub screen image, inputting the content into a neural network model and acquiring a sub screen image corresponding to the content, and the neural network model may be a model trained to identify an input image as a main screen image, and output a sub screen image corresponding to the main screen image.

The main screen image according to one or more embodiments of the disclosure may include at least one of a screen corresponding to a first viewpoint, or a screen including an object that is controllable according to a user command in the content, and the sub screen image may include at least one of a screen corresponding to a second viewpoint rotated by a specific angle based on the first viewpoint, a background screen, or an additional information screen regarding the content.

The image output device according to one or more embodiments of the disclosure may be implemented as a projector device projecting the sub screen image.

The operation S1540 of transmitting to the image output device according to one or more embodiments of the disclosure may include the step of acquiring the sub screen image of a resolution that is relatively lower than the resolution of the main screen image.

The various embodiments of the disclosure may be applied not only to electronic devices, but Furthermore to electronic devices of all types including a display.

The various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as processes and functions described in this specification may be implemented as separate software modules. Each of the software modules can perform one or more functions and operations described in this specification.

Computer instructions for performing processing operations of an electronic device according to the aforementioned various embodiments of the disclosure may be stored in a non-transitory computer-readable medium. Computer instructions stored in such a non-transitory computer-readable medium make the processing operations at the display device 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM, and the like.

Furthermore, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:
   a communication interface;
   a display; and
   a processor configured to:
   based on an image output device being communicably connected to the communication interface, acquire first device information of the image output device,
   based on a content provided from an external server being selected, control the communication interface to transmit the first device information and second device information of the display device to the external server, the second device information corresponding to the display device,
   receive the content from the external server through the communication interface, the content including a main screen image corresponding to the second device information, the content being associated with a sub screen image corresponding to the first device information,
   control the display to display the main screen image,
   control the communication interface to transmit the sub screen image to the image output device such that the image output device outputs the sub screen image,
   provide a user interface (UI) screen for selecting a layout arrangement from among a plurality of layout arrangements based on the first device information and the second device information,
   based on the selected layout arrangement, acquire a guide image based on an arrangement state included in the selected layout arrangement, and
   display the guide image or transmit the guide image to the image output device,
   wherein the sub screen image is located on a first side of the main screen image on the display and on a second side of the main screen image on the display.

2. The display device of claim 1,
   wherein each of the plurality of layout arrangements comprises information on an arrangement state of the main screen image and the sub screen image, the arrangement state indicating a position of the main screen image with respect to a position of the sub screen image.

3. The display device of claim 2, wherein the processor is further configured to:
   based on the selected layout arrangement, adjust a resolution of the main screen image based on the arrangement state included in the selected layout arrangement and resolution information of the display included in the second device information, and
   adjust a resolution of the sub screen image based on the arrangement state and resolution information of the image output device included in the first device information.

4. The display device of claim 3, wherein the processor is further configured to:
   control the image output device such that the sub screen image is displayed in an outside area of the display, the outside area identified based on the information on the arrangement state.

5. The display device of claim 2, wherein the processor is further configured to:
   based on the selected layout arrangement, acquire a first guide image for identifying an outer rim area of the display and a second guide image for identifying a location of an image output through the image output device based on the arrangement state included in the selected layout arrangement,
   control the display to display the first guide image, and
   control the communication interface to transmit the second guide image to the image output device.

6. The display device of claim 2, wherein the processor is configured to:
   based on the selected layout arrangement, identify a size of a maximum screen provided through the display and the image output device based on the arrangement state included in the selected layout arrangement, and
   adjust sizes of the main screen image and the sub screen image based on the identified size of the maximum screen.

7. The display device of claim 1, wherein the processor is further configured to:
   based on the content received from the external server not including the sub screen image, input the content into a neural network model and acquire the sub screen image corresponding to the content from an output of the neural network model, the neural network model being a model trained to identify an input image as the main screen image, and
   output the sub screen image corresponding to the main screen image.

8. The display device of claim 1, wherein the main screen image comprises at least one of a screen corresponding to a first viewpoint, or a screen including an object that is controllable in the content according to a user command, and
   the sub screen image comprises at least one of a screen corresponding to a second viewpoint rotated by a specific angle based on the first viewpoint, a background screen, or an additional information screen regarding the content.

9. The display device of claim 1, wherein the image output device is a projector device projecting the sub screen image.

10. The display device of claim 1, wherein the sub screen image is further located on a third side of the main screen image on the display.

11. A control method of a display device, the control method comprising:
    based on an image output device being connected, acquiring first device information of the image output device;
    based on a content provided from an external server being selected, transmitting the first device information and second device information of the display device to the external server, the second device information corresponding to the display device;
receiving the content from the external server, the content including a main screen image corresponding to the second device information, the content associated with a sub screen image corresponding to the first device information,
displaying on a display of the display device the main screen image;
transmitting the sub screen image to the image output device such that the image output device outputs the sub screen image,
providing a user interface (UI) screen for selecting a layout arrangement from among a plurality of layout arrangements based on the first device information and the second device information,
based on the selected layout arrangement, acquiring a guide image based on an arrangement state included in the selected layout arrangement, and
displaying the guide image or transmitting the guide image to the image output device,
wherein the sub screen image is located on a first side of the main screen image on the display and on a second side of the main screen image on the display.

12. The control method of claim 11,
wherein each of the plurality of layout arrangements comprises information on an arrangement state of the main screen image and the sub screen image, the arrangement state indicating a position of the main screen image with respect to a position of the sub screen image.

13. The control method of claim 12, further comprising:
based the selected layout arrangement, adjusting a resolution of the main screen image based on the arrangement state included in the selected layout arrangement and resolution information of the display included in the second device information; and
adjusting a resolution of the sub screen image based on the arrangement state and resolution information of the image output device included in the first device information.

14. The control method of claim 13, wherein the transmitting the sub screen image to the image output device comprises controlling the image output device such that the sub screen image is displayed in an outside area of the display identified based on the information on the arrangement state.

15. The control method of claim 12, further comprising:
based on the selected layout arrangement, acquiring a first guide image for identifying an outer rim area of the display and a second guide image for identifying a location of an image output through the image output device based on the arrangement state included in the selected layout arrangement;
displaying the first guide image; and
transmitting the second guide image to the image output device.

16. A display device comprising:
a communication interface;
a display; and
a processor configured to:
based on an image output device being communicably connected to the communication interface, acquire first device information of the image output device,
based on a content provided from an external server being selected, control the communication interface to transmit the first device information and second device information of the display device to the external server, the second device information corresponding to the display device,
receive the content from the external server through the communication interface, the content including a main screen image corresponding to the second device information,
process the content to determine a sub screen image,
control the display to display the main screen image,
control the communication interface to transmit the sub screen image to the image output device such that the image output device outputs the sub screen image,
provide a user interface (UI) screen for selecting a layout arrangement from among a plurality of layout arrangements based on the first device information and the second device information,
based on the selected layout arrangement acquire a guide image based on an arrangement state included in the selected layout arrangement, and
display the guide image or transmit the guide image to the image output device,
wherein the sub screen image is located on a first side of the main screen image on the display and on a second side of the main screen image on the display.

17. The display device according to claim 16, wherein the processor is further configured to input the content into a neural network model to determine the sub screen image corresponding to the content from an output of the neural network model, the neural network model being a model trained to identify an input image as the main screen image.

18. The display device according to claim 17,
wherein each of the plurality of layout arrangements comprises information on an arrangement state of the main screen image and the sub screen image, the arrangement state indicating a position of the main screen image with respect to a position of the sub screen image.

19. The display device of claim 18, wherein the processor is further configured to:
based on the selected layout arrangement, adjust a resolution of the main screen image based on the arrangement state included in the selected layout arrangement and resolution information of the display included in the second device information, and
adjust a resolution of the sub screen image based on the arrangement state and resolution information of the image output device included in the first device information.

20. The display device of claim 19, wherein the processor is further configured to control the image output device such that the sub screen image is displayed in an outside area of the display, the outside area identified based on the information on the arrangement state.

* * * * *